United States Patent Office 3,560,202
Patented Feb. 2, 1971

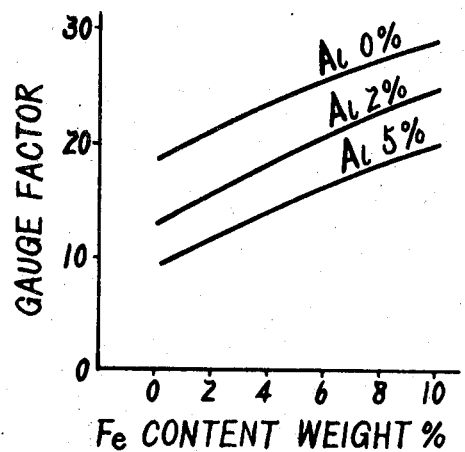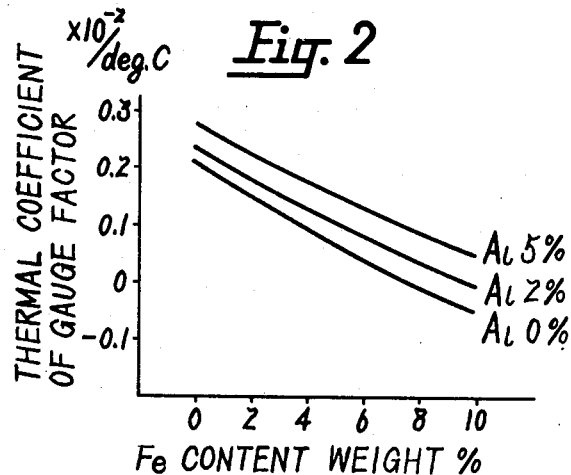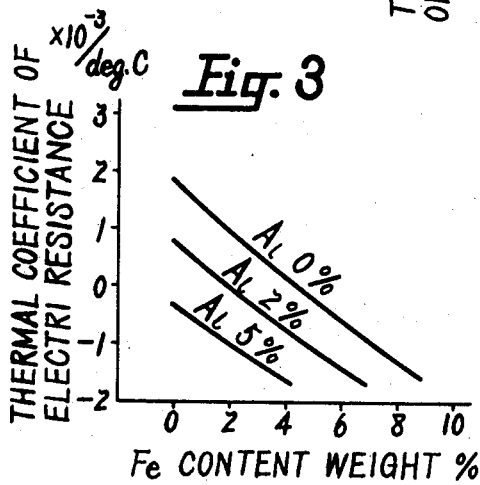

3,560,202
STRAIN METER FUNCTIONING ALLOY
Haruo Kawamoto, 4–1904 Kamitakaido,
Suginami-ku, Tokyo, Japan
Filed Apr. 19, 1968, Ser. No. 722,677
Claims priority, application Japan, Apr. 26, 1967,
42/26,275
Int. Cl. C22c 27/00
U.S. Cl. 75—176                    1 Claim

ABSTRACT OF THE DISCLOSURE

A strain meter functioning alloy of chromium base having specific characteristics towards temperature and sensitivity. These characteristics are provided by the addition of appropriate quantities of Al and Fe to the alloy. The addition of these elements renders the strain meter functioning alloy to have such characteristics that it has larger gauge factor and that temperature coefficient of gauge factor and temperature coefficient of electric resistance can be controlled negative or positive in the neighbourhood of zero point. By virtue of these characteristics, the strain meter equipped with the allow of this invention will be provided with such features that it has the least displacement of zero point and little sensitivity change by temperature variation.

This invention relates to a novel chromium base alloy having specific characteristics towards temperature and sensitivity and useful as a functioning alloy for a vacuum evaporation type strain meter.

The term "a vacuum evaporation type strain meter" as used herein denotes a strain meter whose functioning alloy is deposited on a substratum by vacuum evaporation thereof. The term "adhesion coefficient" as used herein denotes a relative coefficient which shows the degree of adhesiveness between the deposited film and the substratum. In this case, the value of "adhesion coefficient" is close to 1, showing that a close adhesion exists between these two materials. The term "gauge factor" as used herein denotes a factor which indicates the magnitude of metrical change in functioning alloy as a change of electrical resistance according to the unit of stress loaded.

It is preferable for a strain meter functioning alloy to have such characteristics that it has larger gauge factor, and that temperature coefficient of gauge factor and temperature coefficient of electric resistance can be controlled negative or positive in the neighbourhood of zero point. However, an alloy having such favourable characteristics has not been found hitherto, while the invention of this alloy used as the vacuum evaporation type strain meter has satisfied the characteristics mentioned above.

Therefore, the object of this invention is to provide a strain meter functioning alloy with such characteristics that it has larger gauge factor and that temperature coefficient of gauge factor and temperature coefficient of electric resistance can be controlled negative or positive in the neighbourhood of zero point.

Other object and features of the invention will be apparent upon the perusal of the following specification and drawing in which: FIG. 1 shows a diagram explaining the relation between the additional quantity of Al and Fe, and gauge factor, FIG. 2 shows the relation between the additional quantity of Al and Fe, and temperature coefficient of gauge factor and FIG. 3 shows the relation between the additional quantity of Al and Fe, and temperature coefficient of electric resistance.

The alloy of this invention is a ternary alloy characterized in that the said alloy comprises Al 0.1–5%, Cr 85–99.4% and Fe 0.5–10%, and therefore it is one of the specific features of this invention that the cost is cheaper as it is free from noble metals which a platinum base alloy type strain meter essentially possesses. The alloy of this invention has made it possible to control gauge factor, temperature coefficient of gauge factor and temperature coefficient of electric resistance by adding appropriate quantity of Al and Fe. That is to say, the gauge factor of an ordinary vacuum evaporated chromium film is about 18 (a little fluctuation appears in accordance with the thickness of the film), and the temperature coefficient of its gauge factor is about $0.2 \times 10^{-2}$/deg. C. and that the temperature coefficient of its electric resistance is about $2 \times 10^{-3}$/deg. C. (it varies according to vacuum evaporation conditions).

However, these characteristics are changed by an addition of Fe, so that gauge factor is preferably increased while the temperature coefficient of gauge factor as well as the temperature coefficient of electric resistance is decreased as shown in FIG. 1, FIG. 2, and FIG. 3, respectively. Moreover, an addition of Al renders gauge factor to reduce, while increasing the temperature coefficient of gauge factor and decreasing the temperature coefficient of electric resistance. As aforementioned, a strain meter which is well matched with a substratum can be obtained by using the alloy of this invention and depositing the film thereof in adequate conditions of vacuum evaporation.

In the first place, it is most desirable for a strain meter to have the apparent temperature coefficient of electric resistance in deposited state being nil in order to lessen the displacement of zero point by temperature difference.

This apparent temperature coefficient of electric resistance is indicated by the following equation:

$$\alpha = \alpha' + K(C\alpha m - \alpha g)$$

where, $\alpha'$: temperature coefficient of electric resistance of a strain meter before adhesion
K: gauge factor
$\alpha m$: linear expansion coefficient of a substratum
$\alpha g$: linear expansion coefficient of a strain meter
C: adhesion coefficient.

The above equation shows that the apparent temperature coefficient of electric resistance in deposited state will be effected not only by temperature coefficient of the strain meter itself, but also by the characteristics of the substratum. Therefore, in order to eliminate the displacement of zero point, the condition shown by the following equation must be supported:

$$\alpha' = K(\alpha g - C\alpha m)$$

The adhesion coefficient C is normally a value close to 1, linear expansion coefficients $\alpha g$ and $\alpha m$ are close to $0-2 \times 10^{-5}$/deg. C. for ordinary materials and gauge factor K of the alloy of this invention ranges from 10 to 30. Therefore, $\alpha'$ must be selected to take an optional value within the range of $-50 \sim 50 \times 10^{-5}$/deg. C.

The alloy of this invention renders it possible to provide a high precision strain meter having no zero point displacement because of temperature variation, by virtue of it being able to render the apparent temperature coefficient of electric resistance in the deposited state to be nil for the reason that it is possible to provide an alloy having the temperature coefficient within the above-mentioned range by controlling the amount of Al and Fe added as shown in FIG. 3.

In the second place, regarding changes in gauge factor by temperature or temperature coefficient of gauge factor, in the case of the determination of strain itself, the changes in sensitivity by temperature will be made unchanged by elimination of the temperature coefficient of gauge factor.

On the other hand, in many cases, when it is necessary to determine the stress or the value of loaded force by measuring strain, the relation between the strain and the stress or the value of loaded force will be functioned by modulus of elasticity of the material.

The value of this temperature coefficient of modulus or coefficient of thermo-elasticity of ordinary materials lies within the range of $-3 \sim 1 \times 10^{-4}$/deg. C., therefore the change occurred by the variation of 50 deg. C. ranges from $-1.5\%$ to $0.5\%$ and this becomes an error at the time of precise determination.

The elimination of this error is accomplished by counteracting the effect of temperature coefficient of modulus of elasticity or coefficient of thermo-elasticity, with the selected temperature coefficient of gauge factor. For instance, in the case of the alloy of this invention, this aim will be accomplished by controlling the addition of Al and Fe to render temperature coefficient of gauge factor as required within the range of $-3 \sim 1 \times 10^{-4}$/ deg. C.

As aforementioned, in the alloy of this invention, Al acts to increase temperature coefficient of gauge factor and Fe acts, on the contrary, to decrease it, while both Al and Fe act to decrease temperature coefficient of electric resistance. Therefore, a strain meter having little sensitivity change and zero point displacement by temperature variation can be obtained by virtue of the alloy of this invention, by controlling the addition of Al and Fe against substrata of a broad range.

Especially, in the case of using the strain meter as a transducer of mechanical quantity, the effect of this invention becomes important as it enables to provide said meter having high accuracy.

Although a preferred embodiment of the invention has been disclosed in the accompanying drawing and described hereinabove, it would be understood that the various variations may be performed by the skilled in the art and the illustrated disclosure is exemplary and not restrictive, and that applicant does not desire the invention to be restricted to the precise recitations herein but only by the scope and spirit of the appended claim.

The embodiment of the invention in which an exclusive property or privilege is claimed is defined as follows:

1. A strain meter functioning alloy characterized in that the said alloy consists of Al 0.1–5%, Fe 0.5–10% and Cr 85–99.4%.

References Cited

UNITED STATES PATENTS

| | | | |
|---|---|---|---|
| 1,375,455 | 4/1921 | Hansen | 75—176 |
| 1,704,733 | 3/1929 | Fahrenwald | 75—176 |
| 3,027,252 | 3/1962 | McGurty et al. | 75—176 |

CHARLES N. LOVELL, Primary Examiner